R. W. HARROUN.
CARBURETER.
APPLICATION FILED APR. 5, 1913.
1,155,726.
Patented Oct. 5, 1915.
2 SHEETS—SHEET 2.
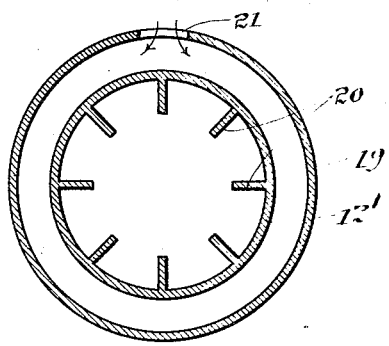
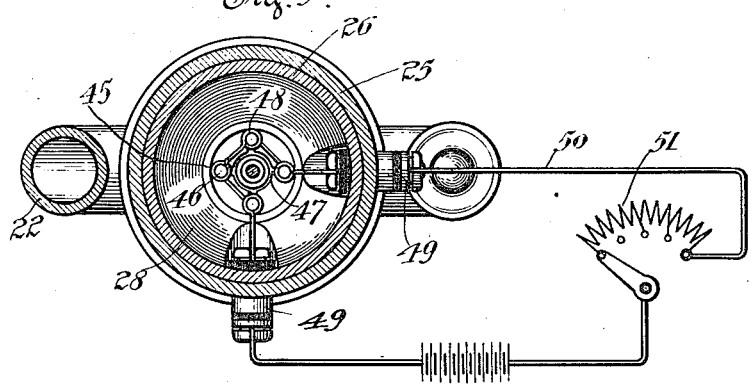
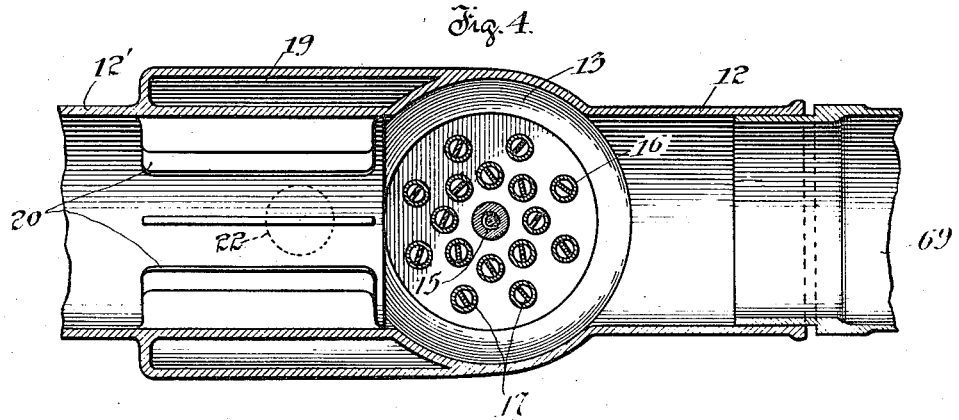

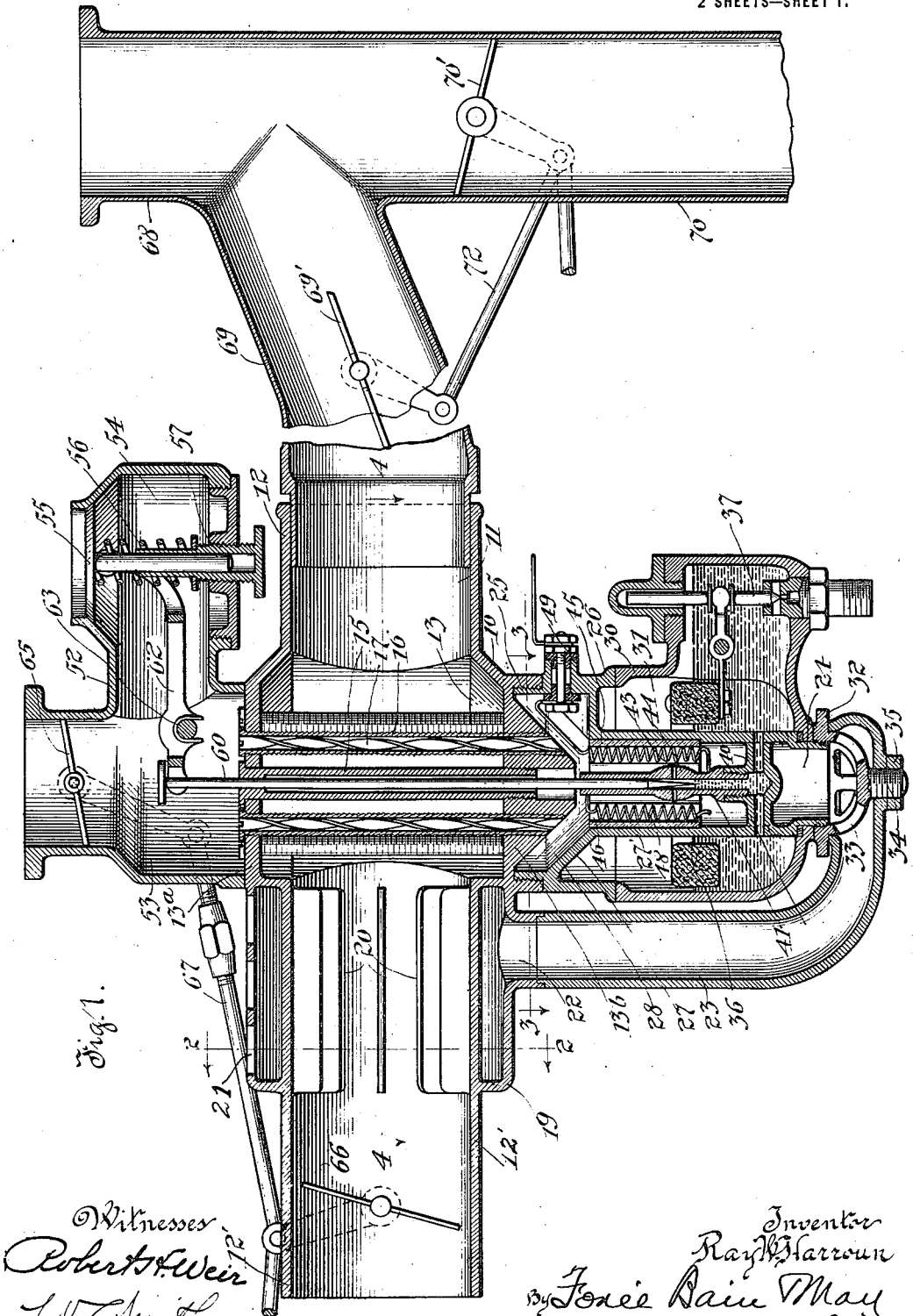

UNITED STATES PATENT OFFICE.

RAY W. HARROUN, OF INDIANAPOLIS, INDIANA, ASSIGNOR, BY MESNE ASSIGNMENTS, TO INVINCIBLE MANUFACTURING COMPANY, A CORPORATION OF PENNSYLVANIA.

CARBURETER.

1,155,726.  Specification of Letters Patent.  Patented Oct. 5, 1915.

Application filed April 5, 1913.  Serial No. 759,090.

*To all whom it may concern:*

Be it known that I, RAY W. HARROUN, a citizen of the United States, residing at Indianapolis, in the county of Marion and State of Indiana, have invented certain new and useful Improvements in Carbureters, of which the following is a specification.

My invention relates to improvements in carbureters, and more particularly to carbureters for utilizing relatively low grade fuel, such as commercial kerosene.

One of the objects of my invention is to provide a carbureter structure equipped with heating appliances acting upon the air and fuel adequately to heat the same to such an extent as to insure proper vaporization of the fuel content of the mixture before it is introduced into the engine.

A further object of my invention is to provide a construction facilitating such regulation of the heat as to satisfy the varying conditions imposed by the operation of the engine.

In the drawings wherein I have illustrated an embodiment of my invention Figure 1 is a longitudinal vertical section through a carbureter embodying my invention; Fig. 2 is a transverse section on line 2—2 of Fig. 1; Fig. 3 is a horizontal section on line 3—3 of Fig. 1; and Fig. 4 is a horizontal section on line 4—4 of Fig. 1.

My present carbureter affords means for utilizing the exhaust gases of the engine to heat the mixture, and also the primary air supply preliminarily to effectuation of the mixture.

In the drawings, 10 indicates in general a heating structure, which may be a casting, shaped to provide a passage 11 for a fluid heating medium through the pipes 12—12' and a transverse cylindrical enlargement 13 between the inlet pipe 12 and the outlet pipe 12'. In the heads or end walls 13ᵃ and 13ᵇ at the top and bottom of the cylindrical enlargement 13 are made alining orifices through which are extended a vertical central tube 15 and an appropriate number of parallel flues or tubes 16, each headed and kerfed at its upper end and screwed into the lower wall 13ᵇ, so that the tubes pass through, but are closed to, the pipe enlargement 13. The tubes 16 are preferably corrugated or otherwise provided, exteriorly, with an extensive heat-receiving surface and each said tube may advantageously contain a spiral strip or fin of metal, 17, to cause fluid in passage through in the tube to whirl therein.

I prefer that the heating structure 10 be employed to apply its greatest heat to a mixture of air and fuel in passage through tubes 16, and that it shall also serve to heat the air content of such mixture before it receives the fuel. The pipe 12' may have integrally cast thereon a concentric drum 19, closely adjacent to the enlargement 13, but in rear thereof with respect to the direction of travel of the exhaust gases, and on the interior of that portion of the pipe 12' which registers with the drum 19 I preferably cast ribs 20 for increase of the effective air-heating surface. The drum 19 is provided with inlet openings 21 and a diametrically opposed outlet opening 22 communicating with the pipe 23 which in turn communicates with a vertical air passage 24 opening at its upper end into communication with the tubes 16, and it is preferably in this passage 24 that the admixture of fuel and air may take place.

Specifically the enlargement 13 of the heating structure has its bottom wall 13ᵇ formed into a conical boss surrounded by a threaded flange 25 and into this flange is screwed a shell member 26 having an inner integral wall 27 tapered to correspond with the conical wall 13ᵇ and spaced apart therefrom for the provision of an expansion chamber 28 opening to the lower ends of tube 16, said wall 27 having a tubular elongation 27' extending downward to constitute the wall of air passage 24, and the lower extremity of the wall 27 being externally shouldered and screw threaded.

A shell 30 fitted against the shoulder of wall 27' abuts at its upper end against wall 26 so as to provide a tight fuel chamber 31 encompassing the air passage 24, the shell 30 being held in place by a nut 32 which is also conveniently provided with a spider 33 bearing a threaded stud 34 which passes through an aperture in the end portion of the air pipe 23 and carries a nut 35 to secure said air pipe in properly tight contact with nut 24 so that it communicates through the spider 33 with the air passage 24.

The shell construction thus particularly described is effective and cheap and may advantageously be employed in the embodiment of my invention.

The fuel chamber 31 may be provided with the usual float 36 automatically controlling the valve 37 in any suitable fashion, for maintaining an appropriate normal level of the fuel in the chamber. For introduction of fuel from said chamber into the air passage 24 I provide a fuel outlet made through a bridge 40 spanning the air passage 24 and communicating with a nozzle-stem 41 extending upward centrally within the air passage 24, said stem having suitable fuel discharge orifices 43 opening laterally therefrom.

I preferably employ electrical heating means arranged for imparting heat to the fuel and air within the space where the fuel, discharged in atomized form from the nozzle openings 43, first mixes with the air and the means to this end I preferably arrange substantially in the manner described in my copending application, Serial No. 755,860, filed March 21, 1913. Thus the wall 27', carries an insulating ring or annulus 45 extending above and below nozzles 43 and having formed therein vertical passages 46 communicating with the central bore of said annulus by radial openings 47 each said channel containing an open coil 48 of resistance wire, said coils being connected together and to terminals 49—49 on the exterior of the shell for convenient connection in an electric circuit 50, suitably energized, and provided with a rheostat or other current regulator. For advantageous utilization of the heat of said coils I preferably enlarge, as at 44, the nozzle stem 41 at the point where the discharge openings 43 are made, so that the enlargement nearly closes the central bore of ring 45 and arrange said discharge openings 43 so that each thereof radially registers with one of the channels of the electrical heater.

It will be manifest now that a primary air current drawn through the openings 21 will be heated in the drum 19 and will pass through the pipe 23 into the air passage 24 wherein it will pass at relatively high velocity through the channels 46, entraining fuel, which, upon projection from the nozzles 43, impinges upon and passes through the electrical heating coils, so that it may, when desired, be subjected to a relatively high degree of heat at the time of admixture with the primary air current; such heating tending to vaporize the low grade fuel in an effective manner. The mixed fuel and air passes into the chamber 28 and thence flows through the tubes 16, which are surrounded by the exhaust gases from the engine, the mixture being caused to whirl in the tubes, so that there is a tendency for the heavier fuel particles to be centrifugally thrown against the hot walls of the tubes thereby to insure a very effective and complete vaporization.

I prefer that the air thus heated and with which the fuel content is first mixed shall be less than the entire volume of air to be employed and that subsequently to the aforesaid mixture and vaporization of the air and fuel to form a relatively dense or "heavy" primary mixture, this primary mixture shall be further mixed with a suitable volume of relatively cold air, the thorough vaporization of the fuel content of the primary mixture enabling the second mixture to take place without deleterious condensation of the fuel.

I therefore mount on the upper wall of the cylindrical enlargement 13 of the heating structure a shell 52 providing mixing chamber 53 with which communicates an air-intake chamber 54 having a spring closed inlet valve 55, the valve spring 56 being adjustable as to tension by a regulating nut 57 which also may receive the stem of the valve and act with said stem as a dash-pot or air-check to retard the opening movement of the valve. The movements of this valve 55 may be employed to good advantage, automatically to control the movements of the fuel valve, in the manner described and claimed in my copending application, Serial No. 714,065, filed August 8, 1912, and I therefore provide a fuel valve 60 guided in the nozzle stem 41 and extending upward through the central tube 15 of the tubular mixture-heater, said valve 60 having variable-leverage connection with the valve 55 through a lever 62 pivoted on a shiftable fulcrum 63 for purposes described in my said copending application.

It will be obvious that when the outlet opening of the mixing chamber 56 is connected to the intake of the gas engine, the air valve 55 will automatically open, to an extent dependent upon the adjustment of its spring, in response to the pressure reduction or suction caused by the suction-stroke of the engine, and where the fuel valve has a set adjustment instead of the variable adjustment shown, suitable proportioning of the fuel to the air contents of the mixture may be obtained by adjustment of the spring tension of the secondary air valve 55.

As is customary in carbureters, I preferably provide a throttle valve 65 adjacent the outlet of the carbureter, and as a refinement of my invention I preferably arrange for the simultaneous throttling of the exhaust passage so that the exhaust gases may be retained in the heating structure to a greater extent when the carbureter is working under low engine speed conditions than when the carbureter is working to its full capacity, as at high-engine speed.

Specifically 66 indicates a butterfly valve for practically surrounding the exhaust, located in the exhaust passage 12' back of the ribs 20. This valve 66 may be connected for operation in harmony with any other valve which is opened to an extent depending upon the working of the engine, as is the case with either the valve 65 which controls the working of the engine or the valve 55 which is automatically responsive to the working of the engine. Specifically the valve 66 is shown connected by levers and a link 67 with the throttle 65 so that the engine is throttled down and thereby supplies less exhaust gases, the exhaust throttle 66 is correspondingly closed and tends to retard the smaller volume of exhaust gases so as to get the benefit of their maximum heating effect upon the heating structure.

I also preferably so connect the engine exhaust pipe with the pipe 12 that the exhaust gases may be diverted from their course through the heating structure at will. Specifically 68 indicates the engine exhaust pipe having two branches 69 and 70 each preferably controlled by a corresponding valve 69' and 70', and the pipe 69 only communicating with the pipe 12 of the heating structure 10. Obviously by opening valve 69' and closing valve 70' all of the exhaust gases will pass through the heating structure, while a reversal of the condition of the valves will cause the exhaust gases to flow out through the pipe 70 without passing through the heating structure. The valves 69'—70' may be interconnected by link 72 to insure coöperation.

It will be observed in respect to the apparatus described that the carbureter herein shown may be employed without priming it with high grade fuel, such as gasolene, when the engine is started, as the electrical heating devices, when working to their full extent, may be, and preferably are, of sufficient heating capacity adequately to vaporize substantially the entire fuel content of the mixture at the time of its introduction into the primary air current. When the engine is in operation the electrical heating structure may also be employed—although usually with its current minimized—to assist the heating devices which receive their heat from the exhaust gases, to insure the complete vaporization of the fuel, but it will be apparent that the utilization of the heat of the exhaust gases in the manner herein shown will minimize the requirement for electrical heating, and under many conditions the electrical heating may entirely be dispensed with especially after the engine is running.
It will be observed that the air is heated to a material degree before it receives the fuel charge, and furthermore while the heating effect due to the passage of mixture through the nest of tubes is subsequent to the primary admixture of the fuel and air, the vaporization of the fuel content in the dense or heavy mixture is completed before the vapor is introduced into the larger or secondary air current in the mixing chamber, and consequently condensation of the fuel on the walls of the mixing chamber is substantially prevented.

While I have herein described in considerable detail a specific embodiment of my invention it will be apparent to those skilled in the art that numerous changes in structural arrangement might be made without departure from the spirit of my invention and within the scope of the appended claims.

What I claim is:

1. In a carbureter, the combination of a pipe, for conducting a fluid heating medium, having a transverse enlargement; a series of tubes, opening through said transverse enlargement; a structure providing an air passage, secured to said heating pipes with the air passage opening to the ends of the tubes; means for introducing fuel into said air pipe and the lower wall of the pipe at the transversely enlarged section formed to present toward the point of fuel mixture a convex conical surface.

2. In a carbureter, the combination of a pipe, for conducting a fluid heating medium, having a transverse enlargement; a tube opening through said transverse enlargement; a structure, providing an air passage secured to said heating pipe with the air passage opening to the end of the tube; a spray nozzle, within the tube, having radial apertures; and means for introducing fuel into the said spray nozzle and directing it radially against the walls of the said tube.

3. In a carbureter, the combination of a bowl, serving as the outer walls of a fuel reservoir; a cover for the said bowl, provided with a centrally arranged downwardly extending cylindrical vaporizing chamber, the bottom of the said bowl having an opening adapted to fit over the lower end of the said cylindrical chamber, a nut, in threaded engagement with the lower end of the said chamber to hold the bowl, lid and chamber in proper position, the said nut having a perforated dome and lug at its center; an air inlet pipe making contact with the outer face of the said nut and having an opening through which the threaded lug extends, and means for securing the said pipe upon the threaded lug.

4. In a carbureter, the combination of a bowl, the walls of which are adapted to form a fuel reservoir; a lid for the said bowl, having a central tubular member extending downward therefrom and formed integral therewith, the said bowl having an opening in its bottom adapted to pass over the lower end of the said tube; a nut, having threaded engagement with the lower end of the tube and adapted to hold the tube, lid and bowl in rigid relation to each other, the said nut having a threaded stud supported by an arch extending from its inner edge; an air supply pipe, one end of which is bent at right angles with its opening adapted to contact and form a joint with the outer surface of the said nut, the said pipe having an opening through which the threaded stud extends, and a nut positioned on the end of the stud to hold the pipe in contact with the nut.

In testimony whereof I hereunto set my hand in the presence of two witnesses.

RAY W. HARROUN.

In the presence of—
 FORÉE BAIN,
 MARY F. ALLEN.